United States Patent
Nagel et al.

(10) Patent No.: US 9,841,166 B2
(45) Date of Patent: *Dec. 12, 2017

(54) APPARATUS AND METHOD INCORPORATING GLOW-IN-THE-DARK MATERIAL TO PRESERVE POWER USAGE WHEN CREATING LIGHT FOR DARK ENVIRONMENTS

(71) Applicants: Alexis Geralyn Marie Nagel, Las Vegas, NV (US); Stephen Roy Nagel, Las Vegas, NV (US)

(72) Inventors: Alexis Geralyn Marie Nagel, Las Vegas, NV (US); Stephen Roy Nagel, Las Vegas, NV (US)

( * ) Notice: Subject to any disclaimer, the term of this patent is extended or adjusted under 35 U.S.C. 154(b) by 34 days.

This patent is subject to a terminal disclaimer.

(21) Appl. No.: 15/146,458

(22) Filed: May 4, 2016

(65) Prior Publication Data
US 2016/0245485 A1    Aug. 25, 2016

Related U.S. Application Data

(63) Continuation-in-part of application No. 14/167,313, filed on Jan. 29, 2014, now Pat. No. 9,335,028.

(60) Provisional application No. 61/757,849, filed on Jan. 29, 2013.

(51) Int. Cl.
| F21V 9/16 | (2006.01) |
| F21V 23/04 | (2006.01) |
| C09K 11/77 | (2006.01) |
| F21L 4/00 | (2006.01) |
| F21V 17/00 | (2006.01) |
| F21V 17/10 | (2006.01) |
| F21Y 103/10 | (2016.01) |
| F21Y 115/10 | (2016.01) |

(52) U.S. Cl.
CPC ............ *F21V 9/16* (2013.01); *C09K 11/7701* (2013.01); *C09K 11/7792* (2013.01); *F21L 4/00* (2013.01); *F21V 23/04* (2013.01); *C09K 11/7774* (2013.01); *C09K 11/7789* (2013.01); *F21V 17/002* (2013.01); *F21V 17/104* (2013.01); *F21V 17/105* (2013.01); *F21V 17/107* (2013.01); *F21Y 2103/10* (2016.08); *F21Y 2115/10* (2016.08)

(58) Field of Classification Search
CPC ....................................................... F21V 9/16
See application file for complete search history.

(56) References Cited

U.S. PATENT DOCUMENTS

| 2,259,416 | A | * | 10/1941 | Gardner | ................... F21L 4/00 362/187 |
| 4,161,388 | A | * | 7/1979 | Bouchard | ................. F21V 9/16 362/109 |
| 4,546,416 | A | | 10/1985 | Pemberton | |
| 5,686,022 | A | | 11/1997 | Murayama et al. | |

(Continued)

OTHER PUBLICATIONS

ISR for PCT/US15/14372 completed Apr. 18, 2015.

*Primary Examiner* — Alexander Garlen
(74) *Attorney, Agent, or Firm* — Schmeiser, Olsen & Watts LLP (57) ABSTRACT

A lighting device, comprising a glow material; a light source, positioned to illuminate the glow material when the light source is activated; and a light source controller, for sequencing sufficient on and off activation of the light source to maintain activate the glow material over a period of time.

5 Claims, 6 Drawing Sheets

(56) References Cited

U.S. PATENT DOCUMENTS

| | | |
|---|---|---|
| 5,757,111 A | 5/1998 | Sato |
| 5,893,629 A | 4/1999 | Gubernick |
| 6,028,694 A | 2/2000 | Schmidt |
| 6,161,936 A * | 12/2000 | Sato .................. F21L 4/005 362/186 |
| 6,435,689 B2 | 8/2002 | Pitts |
| 6,476,302 B1 | 11/2002 | Liu |
| 7,249,431 B1 | 7/2007 | Rose et al. |
| 8,186,021 B2 | 5/2012 | Gonzalez |
| 2006/0225326 A1 | 10/2006 | Robinson et al. |
| 2008/0108454 A1 | 5/2008 | Kohmen |
| 2011/0215348 A1 | 9/2011 | Trottier et al. |
| 2012/0044804 A1 | 2/2012 | Rahman et al. |
| 2012/0056131 A1 | 3/2012 | Nagel |
| 2012/0286675 A1 | 11/2012 | Carmen et al. |
| 2013/0265749 A1 | 10/2013 | O'Brien |

\* cited by examiner

APPARATUS AND METHOD INCORPORATING GLOW-IN-THE-DARK MATERIAL TO PRESERVE POWER USAGE WHEN CREATING LIGHT FOR DARK ENVIRONMENTS

This application is a continuation-in-part of the earlier U.S. Utility Patent Application entitled "AN APPARATUS AND METHOD INCORPORATING GLOW-IN-THE-DARK MATERIAL TO PRESERVE POWER USAGE WHEN CREATING LIGHT FOR DARK ENVIRONMENTS," Ser. No. 14/167,313, filed Jan. 29, 2014, which claims priority to U.S. Provisional Patent Application No. 61/757,849 filed Jan. 29, 2013. The above referenced applications, and each document cited or referenced in the above referenced applications, are hereby incorporated entirely herein by reference.

BACKGROUND OF THE INVENTION

1. Field of the Invention

The present disclosure is directed to an apparatus and method for a glow-in-the-dark product. More specifically, there is an apparatus and method for modifying the emitted light from glow technology, by using larger glow particles, and placing them proximate to a known light source for selected periods of time as further disclosed in the specification and drawings of the invention and related claims.

2. Description of the Related Art

It is well known to in the art how to create glow-in-the-dark, or glowing devices, like glow sticks and such. It is also well known in the art to provide finely sifted powderous glowing material insitue with a polymer and irradiate it with a light source for a short period of time and watch it glow for a short period of time after the light source has been extinguished. The following patents are provided as examples of such known art, and are herein incorporated by reference for their supporting teachings of the present disclosure and appended claims, whereby:

U.S. Pat. No. 5,686,022, teaches of a combined glow matrix consisting of a polymer (epoxy, urethanes, acrylics, etc.) combined with luminescent fine particles, such as strontium-aluminum combined with rare earth elements such as europium.

U.S. Pat. No. 7,249,431, teaches of the combination of a light source and a polymer matrix containing glow particles for a toy device for children to temporarily see a glowing substrate, which light source leaves a drawn line of glowing particles created by the pen light.

U.S. Pat. No. 6,435,689, teaches of further uses of polymer/glow matrix that have been designed such that the glow/polymer coating that is part of the flashlight provides a way to find the flashlight in the dark.

U.S. Pat. No. 8,186,021, teaches of a polymer/glow matrix that was incorporated for conspicuity on a device for helmets for firemen.

US Patent Application PCTIUS 2012/044804, teaches of a polymer/glow matrix or other containment of glow particles having sufficient glow in the dark particles to provide area lighting or identification.

US Patent Application 2012/0056131 A1, pub. Date: Mar. 8, 2012 by the same inventor as this application, Steve Nagel, teaches of a glow-in-the dark device for a lighting source including flexible packaging for such light source.

US Patent Application 2013/0265749 A1, with pub. date of Oct. 10, 2013, to Paul O'Brien, of Arlington, Tex., teaches of a modular flashlight and modular flashlight system, that can be used in the present invention, and is herein incorporated for its teaching of the flashlight technology, for those not familiar with this well-known art and the operation and components associated thereof.

None of these prior art patents or applications teaches the disclosed invention either singly or in combination.

SUMMARY OF THE INVENTION

The present invention has been developed in response to the present state of the art, and in particular, in response to the problems and needs in the art that have not yet been fully solved by currently available glowing devices. Accordingly, the present invention has been developed to provide a prolonged illumination device and method. Additionally, there is provided a device that has a method and device that uses a minimal amount of battery or power source to achieve maximum amount of usable glowing light emission after such power source derived lighting has been extinguished.

Some advantages of the presently disclosed invention involves the attaching a flashlight or powered lighting source to the disclosed glowing material, of any configuration or Design.

In another embodiment of the illustrated invention there is designed a flashlight or powered lighting source, like an LED (light emitting diode) to emit its light's emission throughout the polymer/glow matrix by providing a hole into or through the referenced glow-in-the-dark receiver/transmitter, or wherein the bore contains a clear rod or mirrored/reflecting surface designed to refract the LED's light therealong or therethrough.

Another embodiment of the lighting device, comprising a glow material; a light source, positioned to illuminate the glow material when the light source is activated; and a light source controller, for sequencing sufficient on and off activation of the light source to maintain activate the glow material over a period of time.

A further feature of an embodiment my include a phosphor crystal, that may include a compound of the formula of $MAl2O4:X, Y$, where M is one or more elements selected from the group consisting of calcium, strontium and barium, and X and Y are each a co-activator selected from the group consisting of europium, dysprosium and neodymium as a host crystal, and a long-after glow phosphor comprising a compound of the general formula $Y2O2S:Z$, where Z is an activator made of one or more elements selected from the group consisting of europium, magnesium and titanium as a host crystal.

One embodiment of the lighting device of the present disclosure has a light source controller that includes a power source; circuitry, coupled to the power source that automatically turns on and off the light source.

Reference throughout this specification to features, advantages, or similar language does not imply that all of the features advantages that may be realized with the present invention should be or are in any single embodiment or the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

BRIEF DESCRIPTION OF THE DRAWINGS

In order for the advantages of the invention to be readily understood, a more particular description of the invention briefly described above will be rendered by reference to specific embodiments that are illustrated in the appended drawings. It is to be understood that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

For the purposes of promoting an understanding of the principles of the invention, reference will now be made to the exemplary embodiment. Wherein, each statement of an embodiment is to be considered independent or any other embodiment, despite any use of similar or identical language.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

It is to be understood that the underlying physical principles and scientific measurements behind the operation of illuminescense, or glowing, or glow-in-the-dark sources originate from what is known as rare earth materials to make the glow technology. Specifically, these rare earth materials may include such formulations such phosphor crystals that include, but not limited to, a compound of the general formula $MAl2O4:X, Y$ (M is one or more elements selected from the group consisting of calcium, strontium and barium, and X and Y are each a co-activator selected from the group consisting of europium, dysprosium and neodymium) as a host crystal; and a long-afterglow phosphor comprising a compound of the general formula $Y 2O2S:Z$ (Z is an activator made of one or more elements selected from the group consisting of europium, magnesium and titanium) as a host crystal. When the glow particles are encased or trapped in polymer matrixes they can be shaped and sized to fit the desired dimensions for the intended use. These polymer encased glow particles or otherwise contained in other methods, (e.g. such as but not limited to clear containers, vacuum pouches) are easily activated (i.e. known as charging) from ultra violet light output sources including the sun to most other man made lighting devices.

Present Invention General Comments

Typical, but not limited to, particle activation intended by the application herein is by use of flashlights having one or more LED lights, preferably white light or UV lights. Flashlights are typically powered by batteries, and many times the owner would prefer to have a source of light in their environment, such as a tent or room during the time the environment is dark, but having the flashlight turned on at all times would decrease the usefulness once the batteries have been exhausted. Consequently, the ability to create a utility of having sufficient light from a flashlight or other powered light extended by combining the utility of glow-in-the-dark to be charged by the LEDS, as mentioned above, for merely seconds to a few minutes; wherein the glow particles when contained in the proper amounts and forms can provide sufficient lighting to allow the user to turn off the powered light source, hence preserving the battery life in the case of a flashlight or lowering energy costs of other powered lighting devices would be desirable to the market. Such utility can provide enclosed area lighting to even non-enclosed area lighting, as well as easier identification at various distances. The light source whether a flashlight or other light can be designed to be intermittent (i.e. on-off) to allow the user/owner to have the glow crystals activated on various sequences. The utility of the combination also allows the user/owner to create a low level light from the glow particles versus typically a bright light from other powered light sources, hence not affecting one's night vision if needed.

Figure 1:
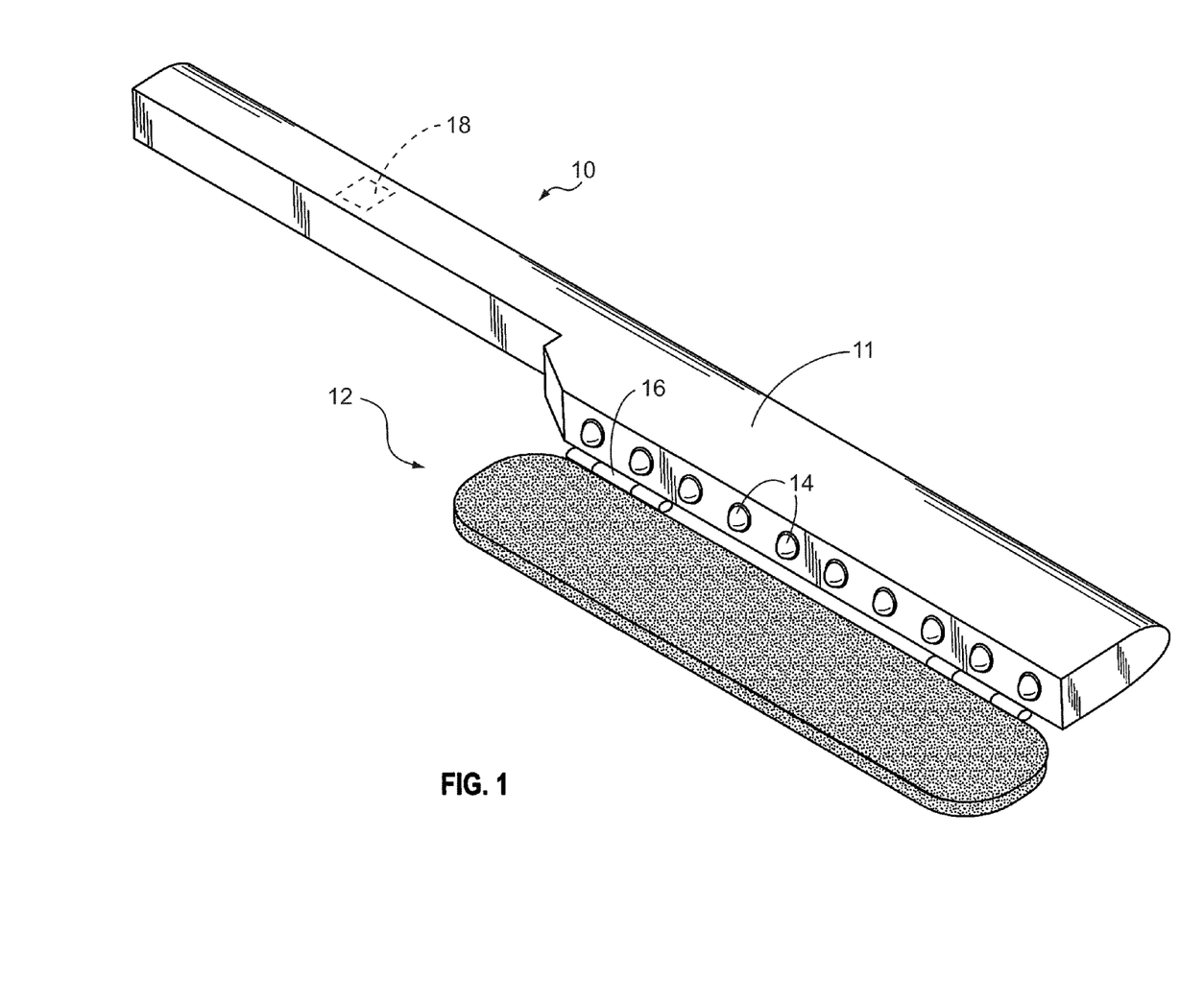
FIG. 1, there is an isometric illustration of one embodiment of the invention.
Figure 2:
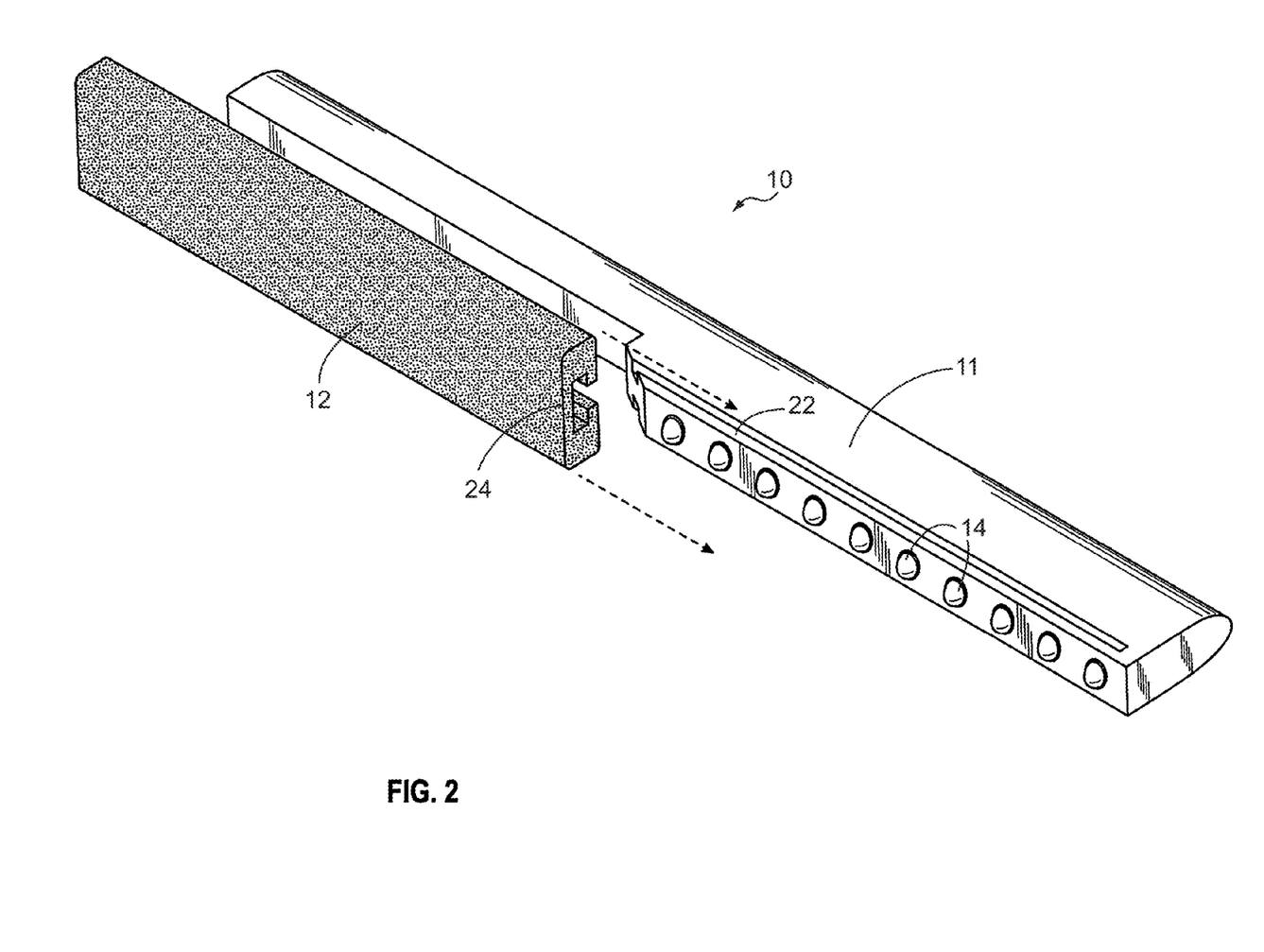
FIG. 2, there is an isometric illustration of another embodiment of the invention.
Figure 3:
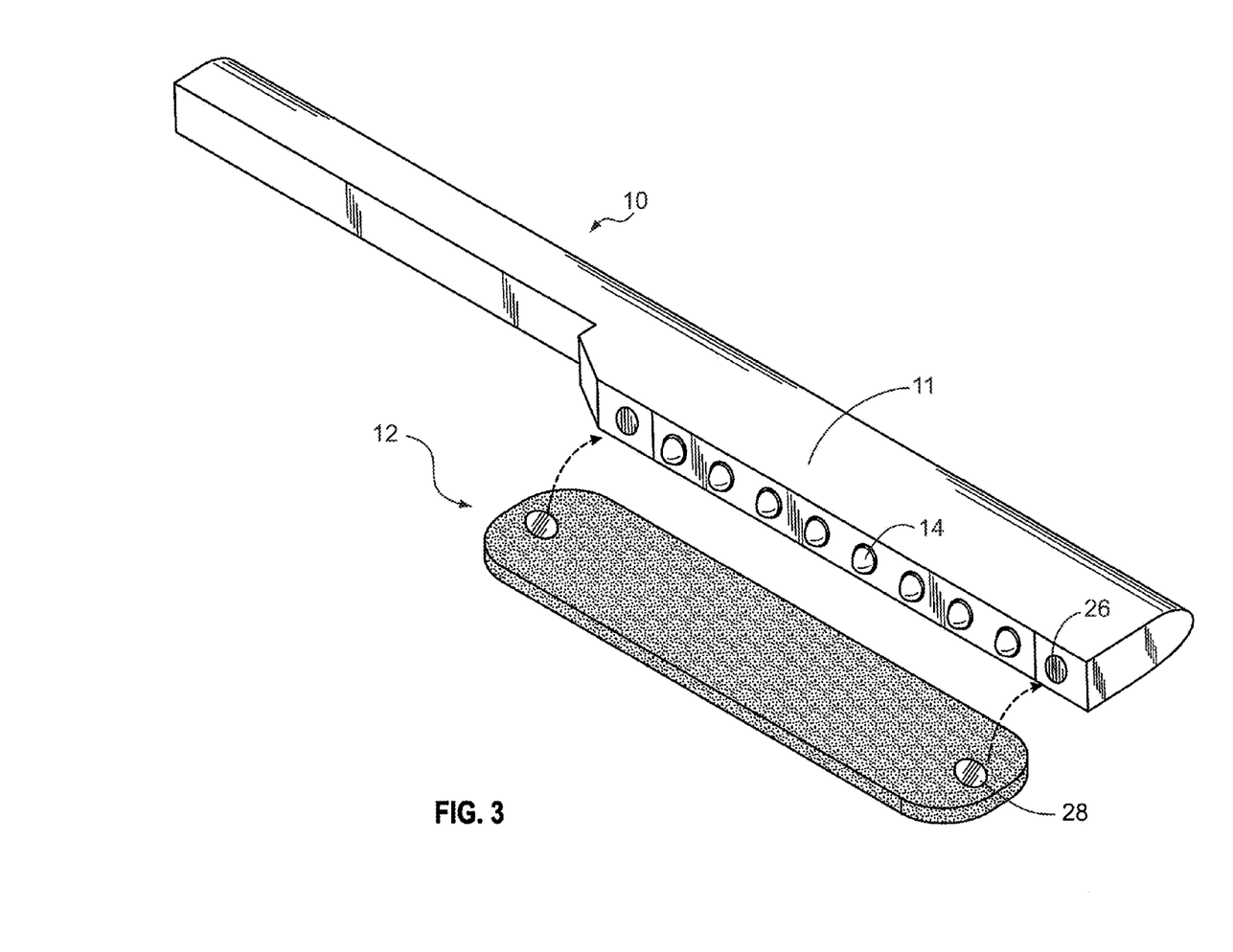
FIG. 3 illustrates an isometric illustration of yet another embodiment of the invention.
Figure 4:
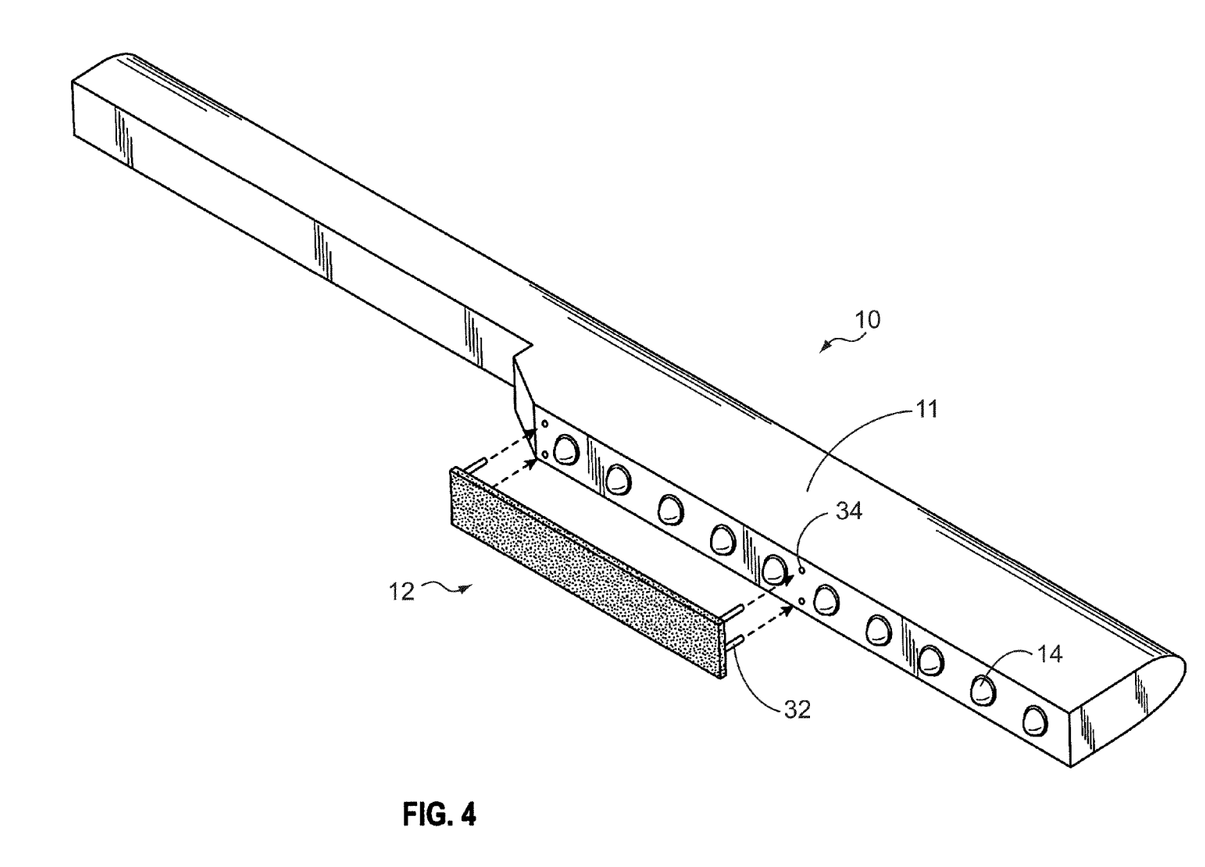
FIG. 4, there is another embodiment of the invention shown isometrically.
Figure 5:
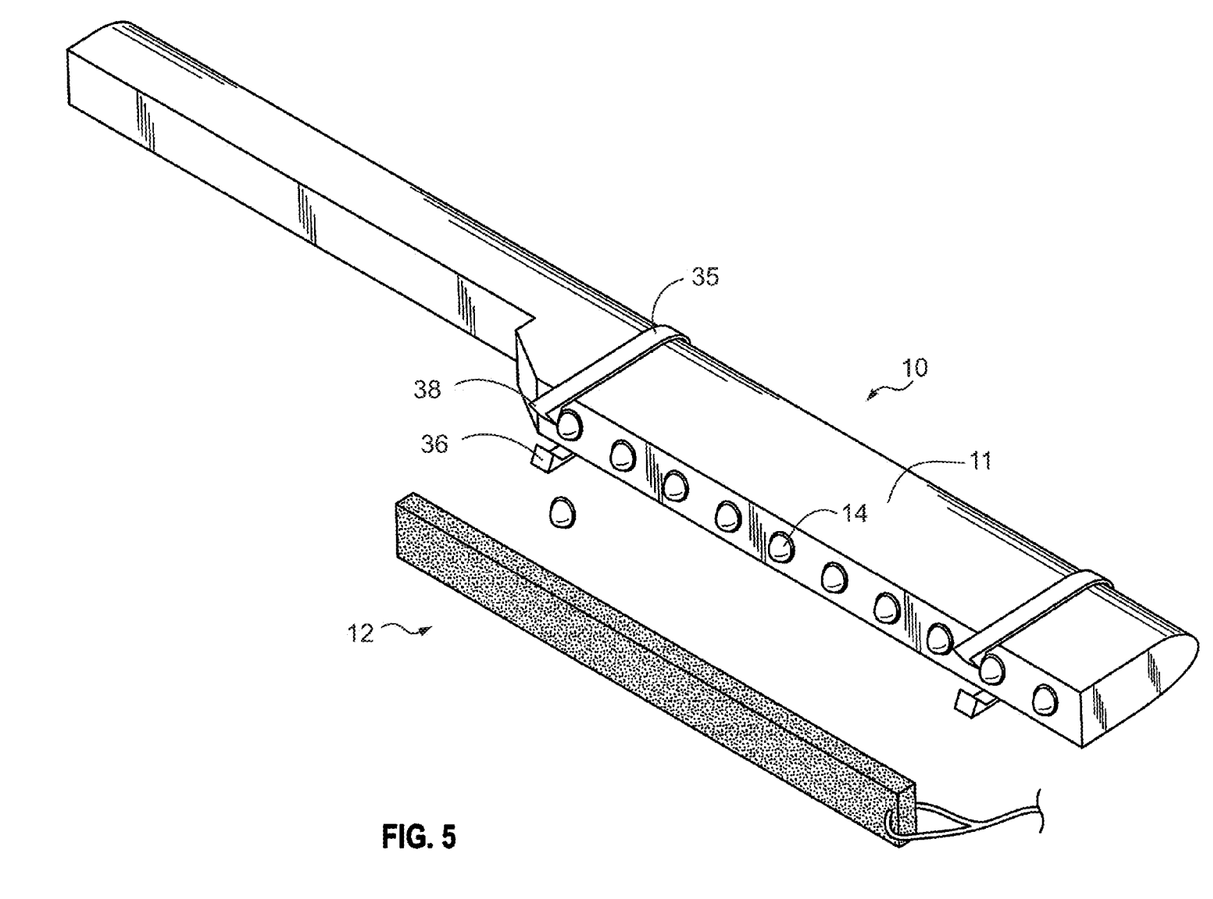
FIG. 5 illustrates one embodiment for another isometric illustration of another embodiment of the invention.

One such example as is shown in the following figures beginning with FIG. 1 using a simple hinge as one means to attach or fasten to the light source or other means as shown in FIG. 2 an ability to slide the polymer/glow matrix (as referenced in the Figures as the glow-in-the-dark receiver/transmitter) over the light source such as LEDs or FIG. 3 wherein the polymer/glow matrix is designed to be magnetized to the light source in this case the flashlight's body to provide a way to activate the polymer/glow matrix or even permanently attached to the light source as shown in FIG. 4. In FIG. 5, the flashlight or other light source would be designed to have an ability to hold or attach a polymer/glow matrix to it for activating the glow crystals using the LEDs for example. All the above Figures are shown to demonstrate the ways, but are not to be limited in the means to attach or configure the combination of the polymer/glow matrix in combination with a flashlight or other powered lighting device.

Figure 6:
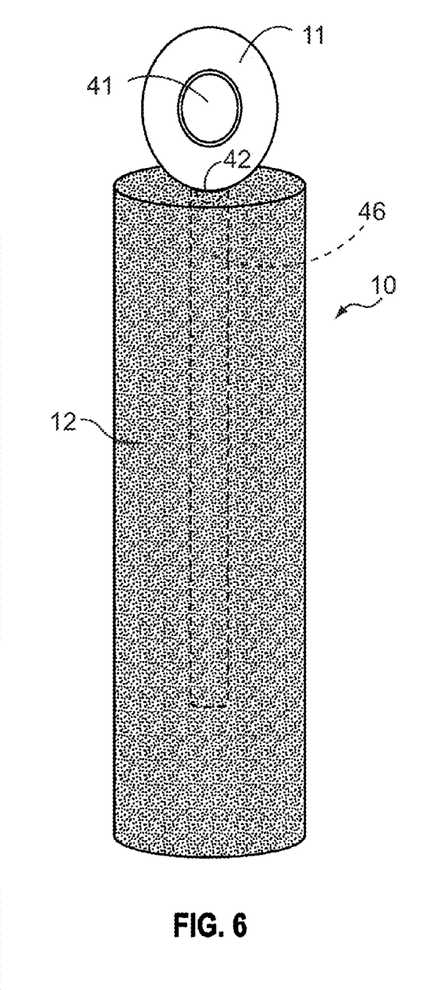
FIG. 6 there is an isometric illustration of another one embodiment of the invention.
Figure 7:
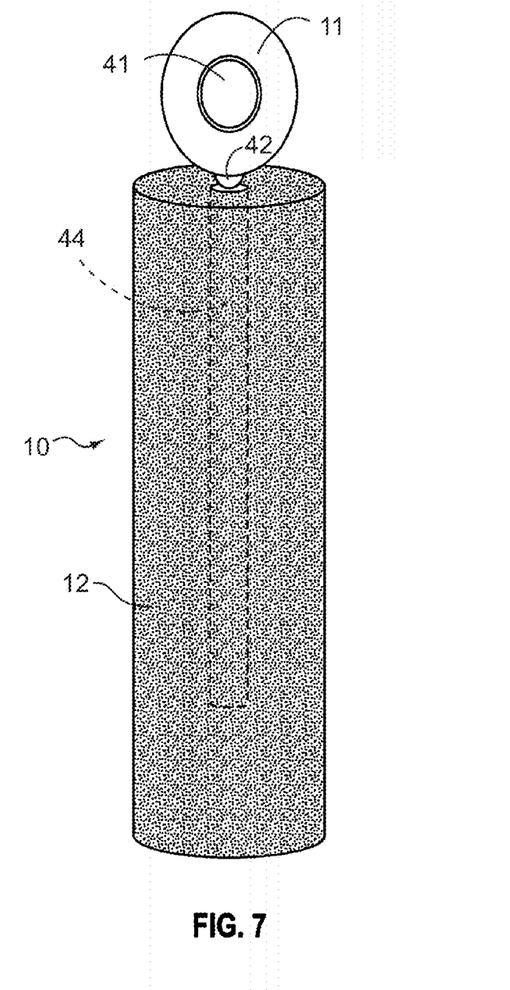
FIG. 7 there is an isometric illustration of yet one other embodiment of the invention.

In another embodiment of the illustrated invention there is designed a flashlight or powered lighting source to emit its light, example an LED's emission throughout the polymer/glow matrix by providing a hole into or through the referenced glow-in-the-dark receiver/transmitter as shown in FIG. 6 or wherein the bore contains a clear rod or mirrored/ reflecting surface designed to refract the LED's light as shown in the example about and within the polymer/glow matrix as in FIG. 7.

Discussion of the Illustrated Embodiments

Referring to FIG. 1, there is an isometric view of one embodiment of the illustrated invention 10. Specifically, there is a light source 11, illustrated in the form of a flash light 11, having LEDs (light emitting diodes) 14. There is illustrated a base glowing material 12 incorporating the phosphorescence rare earth material, referred to previously. The glow material 12 is couplable to the light source 11. The light source 11 has a controller 18, which is designed to control the operation of the light source 11. Specifically, the controller, in one embodiment, may include all needed circuitry and devices to provide both power, such as a battery, and circuitry for electronically controlling the turning on of the light source 11. The turning on and off of the light source 11 may be as simple as turning on a flashlight, with an on and off switch. However, it is also contemplated to have the turning on and off of the light source 11 as sophisticated as creating a programmable timing sequencing or activating the light (LED 14) that may be timed, or strobed. The sequence of the strobing may be a short duration of light exposure followed by a longer duration of no light, whereby the glow material 12 will provide the light to the surrounding environment without the light source 11 being activated. Thereby, after the glow material 12 light illumination intensity will abate or diminish over time, and the next activation of the light source will begin to reactivate or recharge the glow material over a short period of time, thus beginning another sequence of the activation, discharge, and reactivation of the glow material 12 from the light source 11. The controller 18 may also, in one embodiment, be designed to potentially automatically sequence either the power going on and off, or to cut the power to the light source (LED 14), on-and-off to cause an activation of the light emitted from the LED 14. The operation of a typical flashlight is illustrated in the incorporated by reference art of US Patent Application 2013/0265749 A1). As established in the cited art, and the included language in this specification, the glowing material 14, may consist of a base binder material, like a polymer, which incorporates in situ the rare earth glow-in-the-dark material, like phosphorus. This glowing material 14, in this embodiment, is coupled to the flashlight 11 by way of at least one hinge 16.

Referring to FIG. 2 there is an alternative embodiment of the invention 10. Whereby, in addition to the previous teachings of FIG. 1, there is the added concept of attaching the glowing material 12 to the light source 11 by using a type of tongue 24 and grove 22 sliding attachment system, which is well known in the attachment industry.

Referring to FIG. 3 there is another embodiment of the invention 10. In addition to the teaching of the current specification, there is the added concept of using known magnets 26 and 28 placed as illustrated, and imbedded in the glowing material, and light source 11 housing to removably secure the glowing material 12 over the LED, so that when the LED 14 is activated, it will charge the glowing material 12 in a known way. Thus, when the LED is shut off, the glowing material will continue to glow for an extended period of time past what is called the activation period of the glowing material.

Referring to FIG. 4, there is illustrated another embodiment of the invention 10 that operates substantially as the previous embodiments. However, there is taught the added advantage of using a smaller sized glowing material 12 than what the lighting source uses, in this case an array of LEDs is provided. Thus, it is possible to have both direct illumination from an LED to the surrounding environment from the LEDs that are not covered, and to charge up the glowing material when the glowing material is in place to receive the light from the light source. Also, in this illustrated embodiment, there is taught a different attachment device, using a post 32 and hole 34 type securing system that is well known in the art of securing systems design.

Referring to FIG. 5 there is yet a different embodiment of the invention 10. Wherein, there is a well-known in the art securing system that uses a top and bottom catch 36 and 38 respectively, which are each coupled to a strap 35 that holds the securing system to the light source 11.

Referring to FIGS. 6, and 7, there is again a different embodiment of the invention 10. Specifically, there is a glowing material 12, that may be in most any shape, that has a hole, tube, or hollow section 46 extending into the glowing material 12, which is illustrated as being along a length of the glowing material 12. In this embodiment, there is also a light source 11, illustrated as having only a single LED 42 that is activated by a switch 41. In operation of FIG. 6, the LED 42 is placed into the hole 46, and activated for a sufficient time, whereby the hole 46 allows for easy transmission of the emitted light along the entire hole (hollow tube) 46, thus activating the entire area around the hole 46. Whereby, it is noted, without the hollow tube, the LED light would only penetrate a short distance into the solid glow material 12, and not as completely expose the entire area around the hole 46. Wherein, in addition, in an alternative embodiment, it is noted that regarding FIG. 7, instead of having a hollow tube or cavity 46 extending into the material 46, there is a light transmissible material 44, illustrated in the form of a rod, which is inserted into the hollow tube or cavity 46. In one embodiment, the rod 44 could be made of glass or other materials, like polymers, etc., which will transmit the light source along its length and thus charge the glowing material 12.

The present invention, in one embodiment, utilizes known inorganic "glow materials", such as those glow in-the-dark crystals known that are derived from rare earth glow technology including such formation of such phosphor crystals that include, but not limited to a compound of the general formula $MAl_2O_4$:X, Y (M is one or more elements selected from the group consisting of calcium, strontium and barium, and X and Y are each a co-activator selected from the group consisting of europium, dysprosium and neodymium) as a host crystal; and a long-after glow phosphor comprising a compound of the general formula $Y_2O_2S$:Z (Z is an activator made of one or more elements selected from the group consisting of europium, magnesium and titanium) as a host crystal (i.e. "glow materials").

Utilizing one embodiment of a packaging system, the preferred "glow materials" are first placed upon a clear adhesive tape in sizes to match the proper requirements to fit into a selected vacuum pouch. The discussed, but not limited to, vacuum pouches are typically less than 200 sq. in. size for ease of production and users can add more pouches to create more light if needed in a given area. After the "glow material" crystals are placed in the vacuum pouch a final seal is then completed in a typical vacuum machine, such as those used in food or electronic packaging production facilities. Present methods used to place the crystals in the vacuum pouch is accomplished by using pre-selected clear tape on both sides of the "glow materials" and then insertion into the opened vacuum pouch prior to final vacuum and sealing. This method also adds more thickness for protecting the pouch from puncture, but also in the event the pouch is punctured the "glow materials" remain positioned in the pouch as they are affixed between the two layers of tape. Further production methods (e.g. large continuous production runs) could be accomplished by having the "glow material" crystals placed upon a continuous or non-continuous membrane of clear plastic typically used in vacuum forming, such that the membrane(s) could be periodically cut, vacuumed and sealed using known vacuum forming packaging methods. Pre-coating the "glow material" crystals and/or the vacuum pouch with semi-clear or opaque dyes could also be accomplished to provide additional features, such as colors. Inserting other items into the vacuum pouch such as corporate logo stickers, safety reflective tapes, mirror finished films such as Window tint films or safety color ribbons can also be done prior to final vacuum to provide additional features related to safety or personalization.

The use of the flexible packaging, as described, also allows the users to easily attach this new light source using many methods of applications, such as products like Velcro, or even adhesive tapes, rubber bands, etc.

Using the aforementioned large size "glow material" crystals, it is also contemplated to use a polymer matrix to hold or contain the glow material therein. As an example, one could make this device from known existing polymer technology that can be in rigid (e. g. nonflexible epoxy polymers) or in semi-rigid forms (e.g. polyurethanes). Additionally, it is contemplated to not exclusively use a rod shape for the encapsulating vessel of the glow material. A skilled artisan will understand that any shape can be impregnated with the glow material, just so there is sufficient light transmissibility therethrough to enable activation of the specific glow particles that are insitu to the glow material 12.

It is noted, additionally, although a single hollow cavity 46 or light transmission rod 44 is illustrated it is also contemplated that the dimensions of these parts or number of these parts do not have to be a single uniform dimension, or a single item at all, but could be multiple.

Although the illustrated invention has been presented as a flashlight and a glow material held against the light source, the broad concept of the invention is only limited to the claims of the invention. For example, it is contemplated to have the invention as broad as a lighting source that is connected to a power supply that is attached, permanently or temporarily, to the glow material. Whereby, in one embodiment, the light source is only automatically or programmably activated for a short period of time (fractions of seconds, or minutes) sufficient to activate the glow material, and then let the glow material illuminate for a period of time after the activation time, whereby upon a certain period of time, the light source is activated again, to once again charge up the glow material after it has discharged; this sequence can repeat innumerable time. There can be a power system that includes a power source and power controls 18 to periodically and controllably activate the light source so that a person need not watch the glow material to determine when it needs to be activated again after the glowing effect has subsided.

In some embodiments, the power source may be a mechanical power source. A mechanical power source may be used to supply power to the light source. The mechanical power source may be powered by electricity generated by a user. The mechanical power source may include various types of mechanisms, such as, without limitation a squeeze handle, a crank, or shake mechanism. The mechanical power source may further comprise a spring, a flywheel, a battery and/or a capacitor.

A squeeze handle requires the user repeatedly squeeze the squeeze handle, that in turn spins a flywheel that may be attached to a small dynamo. The dynamo supplies electric current to the light source.

A crank mechanism may be used to generate electric current in response to rotating the crank. The electric current may be directed to the light source to operate the light source. In some embodiments, rotating the crank may supply electric current to a rechargeable battery in order to charge the battery. The battery may then be utilized to supply power to the light source. In other embodiments, the crank mechanism may be used with a spring, such as a flat spiral wound mainspring. As the crank is rotated, the spring is wound up. Moving an actuator to an on position allows the spring to unwind and thereby turn a generator for supplying electric current to the light source to illuminate the light source.

A shake mechanism may include a Faraday mechanism, wherein a linear electrical generator which charges a battery or a battery-like supercapacitor when the shake mechanism is shaken. The battery or capacitor powers the light source. In come embodiment, the operation of the shake mechanism may supply electric current directly to the light source to illuminate the light source. The shake mechanism may include of a slider having a magnet, such as, but not limited to a rare earth magnet, which moves back and forth through a center of a solenoid when the shake mechanism is shaken. A current is induced in the loops of wire by Faraday's law of induction each time the magnet slides through, which may charge the battery or the capacitor through a rectifier and some other circuitry.

Each time that the user wishes to charge the glow material, the user may operate the mechanical power source to activate the light source to illuminate the glow material. The mechanical power source may powered for a predetermined amount of time, such as a user defined time or other time necessary to charge the glow material to the desired brightness. The user may stop operation of the mechanical power source and the glow material is maintained active over a period of time.

Applications for such a strobing affect to the glow material could be legion. For example, an exit sign in buildings, could take advantage of this use. Whereby, the glow material can for the wording "EXIT" and a lighting source could strobe once every minute for a period of time sufficient to cause the activation of the glow material. Then the power is shut off, thus saving power, and the glowing material will illuminate sufficiently for an extended period of time without using any additional power.

Thus, while the present invention has been fully described above with particularity and detail in connection with what is presently deemed to be the most practical and preferred embodiment of the invention, it will be apparent to those of ordinary skill in the art that numerous modifications, including, but not limited to, variation in size, materials, shape, form, function and manner of operation, assembly and use may be made, without departing from the principles and concepts of the invention as set forth in the claims.

What is claimed is:
1. A lighting device, comprising:
   a) a glow material, wherein the glow material includes a compound of the formula of $MAl_2O_4:X, Y$, where M is one or more elements selected from the group consisting of calcium, strontium and barium, and X and Y are each a co-activator selected from the group consisting of europium, dysprosium and neodymium, and a long-after glow phosphor comprising a compound of the general formula $Y_2O_2S:Z$, where Z is an activator made of one or more elements selected from the group consisting of europium, magnesium and titanium;

b) a light source, positioned to illuminate the glow material when the light source is activated; and c) a mechanical power source for activation of the light source during operation of the mechanical power source and non-activation of the light source during non-operation of the mechanical power source to maintain activation of the glow material over a period of time.

2. The lighting device of claim 1, wherein the glow material includes phosphor crystals.

3. The lighting device of claim 1, further comprising circuitry, coupled to the mechanical power source that activates the light source during operation of the mechanical power source.

4. A lighting device, comprising:

a) a glow material;

b) a light source, positioned to illuminate the glow material when the light source is activated; and c) a mechanical power source for activation of the light source during operation of the mechanical power source and non-activation of the light source during non-operation of the mechanical power source to maintain activation the glow material over a period of time, wherein the glow material includes phosphor crystals, and wherein the phosphor crystals include a compound of the formula of $MAl_2O_4:X, Y$, where M is one or more elements selected from the group consisting of calcium, strontium and barium, and X and Y are each a co-activator selected from the group consisting of europium, dysprosium and neodymium, and a long-after glow phosphor comprising a compound of the general formula $Y_2O_2S:Z$, where Z is an activator made of one or more elements selected from the group consisting of europium, magnesium and titanium.

5. The lighting device of claim 4, further comprising circuitry, coupled to the mechanical power source that activates the light source during operation of the mechanical power source.

* * * * *